(12) United States Patent
Kajiura et al.

(10) Patent No.: US 8,231,854 B2
(45) Date of Patent: Jul. 31, 2012

(54) METHOD FOR TREATING CARBON NANOTUBES, CARBON NANOTUBES AND CARBON NANOTUBES DEVICE COMPRISING THEREOF

(75) Inventors: Hisashi Kajiura, Tokyo (JP); Yongming Li, Tokyo (JP); Xianglong Li, Beijing (CN); Yunqi Liu, Beijing (CN); Lingchao Cao, Beijing (CN); Lei Fu, Beijing (CN); Dacheng Wei, Beijing (CN); Yu Wang, Beijing (CN); Daoben Zhu, Beijing (CN)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 12/270,026

(22) Filed: Nov. 13, 2008

(65) Prior Publication Data

US 2009/0285746 A1    Nov. 19, 2009

(30) Foreign Application Priority Data

Dec. 20, 2007    (CN) .......................... 2007 1 0159924

(51) Int. Cl.
*D01F 9/12*    (2006.01)
*C01B 31/00*    (2006.01)
(52) U.S. Cl. ...................... 423/447.1; 423/461; 977/845
(58) Field of Classification Search .... 423/447.1–447.3, 423/445 B; 977/742–754, 842–848; 428/367; 204/157.47; 427/249.1–249
See application file for complete search history.

(56) References Cited

U.S. PATENT DOCUMENTS

2006/0006377 A1 *    1/2006    Golovchenko et al. ......... 257/39

FOREIGN PATENT DOCUMENTS

| JP | 03-008444 | 1/1991 |
| JP | 2000-181053 | 6/2000 |
| JP | 2007-031238 | 2/2007 |
| WO | 2006096200 | 9/2006 |

OTHER PUBLICATIONS

Strano, et al., Electronic Structure Control of Single-Walled Carbon Nanotube Functionalization, Science 2003; 301: 1519-1522.*
Maeda, Yutaka et al., "Large-Scale Separation of Metallic and Semi-conducting Single-Walled Carbon Nanotubes," J. Am. Chem. Soc., vol. 127, pp. 10287-10290, 2005.
Chattopadhyay, Debjit et al., "A Route for Bulk Separation of Semi-conducting from Metallic Single-Walled Carbon Nanotubes," J. Am. Chem. Soc., vol. 125, pp. 3370-3375, 2003.
Li, Huaping et al., "Selective Interactions of Porphyrins with Semi-conducting Single-Walled Carbon Nanotubes," J. Am. Chem. Soc., vol. 126, pp. 1014-1015, 2004.
Chen, Zhihong et al., "Bulk Separative Enrichment in Metallic or Semiconducting Single-Walled Carbon Nanotubes," Nano Letters, vol. 3, pp. 1245-1249, 2003.
Zheng, Ming et al., "Structure-Based Carbon Nanotube Sorting by Sequence-Dependent DNA Assembly," Science, vol. 302, pp. 1545-1548, 2003.

* cited by examiner

*Primary Examiner* — Daniel C. McCracken
(74) *Attorney, Agent, or Firm* — K&L Gates LLP

(57) ABSTRACT

An efficient and cost-effective method for treating carbon nanotubes (CNTs) is provided. The method includes comprising: dispersing said carbon nanotubes in a dispersing medium to prepare a dispersion system; mixing said dispersion system with adsorbent so that type-specific carbon nanotubes contained in said dispersion system are absorbed onto the adsorbent, wherein the adsorbent is modified by a chemical/biological modifier so as to have different adsorption selectivity to carbon nanotubes of different types; and separating the adsorbent from the dispersion system, whereby the type-specific carbon nanotubes adsorbed onto the adsorbent is separated from the carbon nanotubes of another type enriched in the dispersion system; carbon nanotubes produced by the treatment method, and CNTs devices comprising thereof.

14 Claims, 10 Drawing Sheets

METHOD FOR TREATING CARBON NANOTUBES, CARBON NANOTUBES AND CARBON NANOTUBES DEVICE COMPRISING THEREOF

CROSS REFERENCES TO RELATED APPLICATIONS

The present application claims priority to Chinese Patent Application CN 200710159924.6 filed in the Chinese Patent Office on Dec. 12, 2007, the entire contents of which is being incorporated herein by reference.

BACKGROUND

The present application relates to a method for treating carbon nanotubes (CNTs), carbon nanotubes produced by the treatment method, and CNTs devices comprising thereof. Specifically, the present application is directed to an efficient and cost-effective separation/enrichment of CNTs of different types or properties such as semi-conducting single-walled carbon nanotubes (S-SWNTs), metallic single-walled carbon nanotubes (M-SWNTs) and chiral CNTs, and carbon nanotubes produced by the treatment method, and CNTs devices comprising thereof.

As a one-dimensional nano-material, CNTs have attracted increasing attention due to their excellent electrical, mechanical, and chemical properties. Intensive studies on the nano-material have proposed many potential widespread applications for CNTs in various fields. For example, CNTs can be applied in the fields of electronics, optics, mechanics, biotechnology, and ecology, such as, nano-field effect transistor, field emission source, hydrogen storage material, high strength fiber, and sensor.

CNTs can be classified into single-walled carbon nanotubes (SWNTs) and multi-walled carbon nanotubes (MWNTs) according to the number of the wall-forming atomic layers. Specifically, MWNTs may be considered as being formed by nesting SWNTs with different diameters. Research and application in the field of CNTs have shown that SWNTs and MWNTs with relatively small number of atomic layers are of importance due to the outstanding performance.

Based on the conductivity of SWNTs, SWNTs can be further classified into M-SWNTs and S-SWNTs. M-SWNTs, for example, can be used in various devices including conductive film, field emission and the like. S-SWNTs have found their application, for example in nano-filed effect transistors, sensors and the like. However, SWNTs are generally grown as bundles of M-SWNTs and S-SWNTs, and thus the application of either M-SWNTs or S-SWNTs is limited by its proportion in the bundles. It has been theoretically determined that SWNTs are usually comprised of $\frac{1}{3}$ proportional M-SWNTs and $\frac{2}{3}$ proportional S-SWNTs according to the diameter and chiral angle of SWNTs (Saito R et al., Material Science and Engineering, 1993, B19: 185-191). The carbon materials produced by different process conditions and purification treatment and the like, however, do not contain M-SWNTs and S-SWNTs in the theoretical ratio of 1:2. In addition, the metallicity of CNTs gradually increases with the increase of the number of the carbon atomic walls, and finally CNTs become metallic.

The conventional methods for preparing CNTs include graphite arc-discharging process, chemical vapor deposition process, laser evaporation process, and the like. CNTs obtained by these conventional methods usually comprise bundles of M-SWNTs mixed with S-SWNTs. Therefore, in order to put M-SWNTs and S-SWNTs into their respective application field, it is necessary to separate the CNTs of different conductivity from each other. Hence, separation of CNTs has become one of the important topics in the research.

So far, many methods have been proposed to separate M-SWNTs and S-SWNTs by utilizing their differences in chemical and physical properties.

Chemical approaches have been considered to be promising routes for efficiently separating SWNTs. Some chemical/biological molecules have been demonstrated to have diameter/properties-selective to SWNTs. For example, octadodecylamine [J. Am. Chem. Soc. 2003, 125, 3370; Appl. Phys. Lett. 2004, 85, 1006] or porphyrin [J. Am. Chem. Soc. 2004, 126, 1014] have been chosen to separate S-SWNTs from M-SWNT, starting from carboxy-functionalized SWNTs. Furthermore, it is also reported that there is selectively covalent functionalization in SWNT [Science 2003, 301, 1519]. However, the pristine structure and properties of the treated SWNTs have been either damaged or degraded, resulting in a low yield of the desired product.

By utilizing the selective interaction between the pristine SWNTs and bromine, M-SWNTs have been separated from the S-SWNTs based on the density difference of the resulting samples [Nano Lett. 2003, 3, 1245]. Density-gradient ultracentrifugation has been recently proposed to be a promising process for separating CNTs of different types in accordance with their diameter, band gap and electronic characterization [Nature Nanotechnology 2006, 1, 60]. However, the separation processes are time-consuming and high cost is required for centrifugation.

It is also reported that M-SWNTs and S-SWNTs wrapped with DNA have been separated by anion exchange chromatography or centrifugation [Science 2003, 302, 1545; Nano Lett. 2004, 4, 543]. The use of anion exchange chromatography separation leads to high cost and it is required to remove the wrapping DNA from SWNTs.

Separation of SWNTs has been reported previously by utilizing the selective interaction between amino group and M-SWNTs [Chem. Phys. Chem. 2004, 5, 619; J. Am. Chem. Soc. 2005, 127, 10287]. However, time-consuming and expensive centrifugation process is also involved in the separation process.

Therefore, there exists a need for a new process for treating CNTs, which can be used to separate CNTs of different types or properties, such as M-SWNTs and S-SWNTs more efficiently, conveniently, and cost-effectively.

SUMMARY

According to an embodiment, an efficient and cost-effective separation/enrichment of CNTs of different types or properties such as semi-conducting single-walled carbon nanotubes (S-SWNTs), metallic single-walled carbon nanotubes (M-SWNTs) and chiral CNTs is provided, and the treated product can contain high proportional, or even 100% of the desired CNTs.

In a first embodiment, the present application provides a method for treating CNTs, comprising:

Dispersing said CNTs in a dispersing medium to prepare a dispersion system;

Mixing said dispersion system with an adsorbent so that type-specific CNTs contained in said dispersion system are absorbed onto the adsorbent, wherein the adsorbent is modified by a chemical/biological modifier so as to have different adsorption selectivity to CNTs of different types or properties; and Separating the adsorbent from the dispersion system, whereby the type-specific CNTs adsorbed onto the adsorbent is separated from the CNTs of another type enriched in the dispersion system.

Enrichment or separation of CNTs of different types or properties such as M-SWNTs and M-SWNTs can be achieved by the method of the present application. For example, use of a chemical/biological modifier which exhibits absorption selectivity to M-SWNTs results in M-SWNTs absorbed onto the adsorbent, and S-SWNTs enriched in the resultant dispersion system. As an alternative, use of a chemical/biological modifier which exhibits absorption selectivity to S-SWNTs result in S-SWNTs absorbed onto the adsorbent, and M-SWNTs enriched in the resultant dispersion system.

In one embodiment, the CNTs used in the method according to an embodiment are SWNTs or MWNTs. In one preferred embodiment, the CNTs of different types include M-SWNTs, S-SWNTs, and chiral CNTs.

In one embodiment, the adsorbent includes an inorganic oxide material. In particular, the inorganic oxide material is selected from the group consisting of silica materials, alumina materials, magnesia materials, or combination thereof. Preferably, the silica comprises silica spheres, silica aggregates, silica wafers, silica films, porous silica, or combination thereof. More preferably, the inorganic oxide material can be selected from silica spheres or aggregates of an irregular shape. Even more preferably, the inorganic oxide material is silica spheres or aggregates having the average diameter of 100 nm-50 μm, preferably 1 μm-40 μm, and more preferably 20 μm. In addition, it is preferred that the silica spheres or aggregates are of an irregular or coarse shape.

In the method according to an embodiment, the adsorbent is modified with a chemical/biological modifier. Preferably, the chemical/biological modifier is selected from the group consisting of bromine, amino-containing compounds, large neutral aromatic molecules, charge transfer aromatic molecules, diazo compounds, and combination thereof, which exhibit adsorption to M-SWNTs. Amino-containing compounds include propylamine, octylamine, octadecylamine, or 3-aminopropyltriethylsilane. Large neutral aromatic molecules include naphthalene or anthracene. Charge transfer aromatic molecules include 2,3-dichloro-5,6-dicyano-1,4-benzoquinone (DDQ) and 7,7,8,8-tetracyanoquinodimethane (TCNQ). Preferably, the chemical/biological modifier can be selected from the group consisting of porphyrin, poly(9,9-dioctylfluorenyl-2,7-diyl), single-strand DNA with specific sequence, which exhibit adsorption to S-SWNTs. Preferably, the chemical/biological modifier can be diporphyrins, which exhibit adsorption to chiral CNTs.

In one embodiment, the dispersing medium can include a polar solvent selected from the group consisting of water, alcohols, ethers, ketenes, amides, halogenated hydrocarbons, and combination thereof. More preferably, alcohol polar solvents include lower alcohol (alcohol containing from one to six carbon atoms) such as methanol, ethanol, and the like. Ether polar solvents include diethyl ether, tetrahydrofuran and the like. Ketone polar solvents include N-methyl-2-pyrrolidone (NMP), methyl ethyl ketone and the like. Amide polar solvents include N,N-dimethyl formamide, N,N-diethyl formamide, and the like. Halogenated hydrocarbons include ortho-dichlorobenzene (ODCB) and chloroform.

In one preferred embodiment, the dispersing medium includes a surfactant and the above-mentioned polar solvent. The surfactant is selected from the group consisting of ionic surfactant such as sodium dodecyl sulfate (SDS); non-ionic surfactant such as Triton X100; cationic surfactant, zwitterionic surfactant and combination thereof. It is preferred that the dispersing medium is a system consisted of an ionic surfactant such as SDS and a polar solvent such as water and alcohols. The amount of the surfactant based on the whole weight of the dispersing medium is not more than 1%, preferably 0.2-1.0 wt %, and more preferably 0.5 wt-0.9 wt %. For example, the dispersing medium preferably contains 0.2-1.0 wt %, and more preferably 0.5 wt-0.9 wt % of SDS.

In the method of an embodiment, an ultrasonication is optionally performed after said adsorbent are mixed with the dispersion system.

The method of an embodiment further comprises a post-treatment step of treating the adsorbent absorbed with the type-specific CNTs so as to separate the type-specific CNTs and the adsorbent, and regenerate the adsorbent for further use. The post-treatment step preferably includes treating said adsorbent by means of ultrasonication or annealing, or with chemical agents selected from acids such as hydrofluoric acid and bases such as sodium hydroxide.

In addition, the CNTs to be treated in the method of the present application can be SWNTs, specifically, M-SWNTs or S-SWNTs or chiral CNTs.

Preferably and optionally, the method of an embodiment can be recycled at least once so as to obtain higher proportional CNTs of the desired properties or types.

In a second aspect, the present application is directed to CNTs produced by the treatment method. The CNTs obtained by the treatment method of an embodiment includes S-SWNTs, or M-SWNTs or chiral CNTs. As compared with the CNTs produced or treated by conventional processes, the CNTs obtained the treatment method is of very high proportion, even up to 100%, and therefore possess extraordinary characteristic.

In a third aspect, the present application provides a CNTs device, which comprises CNTs produced by the method of an embodiment. Preferably, the device includes CNTs conductive film, field emission source, transistor, conductive wire, nano electro-mechanic system (NMES), nano cantilever, quantum computing device, lighting emitting diode, solar cell, surface-conduction electron-emitter display, filter, drag delivery system, thermal conductive material, nano nozzle, energy storage system, fuel cell, sensor, or catalyst support material.

Additional features and advantages are described herein, and will be apparent from the following Detailed Description and the figures.

DETAILED DESCRIPTION

An embodiment of the present application will be described below with reference to the drawings.

In one embodiment, the present application provides a method for treating CNTs, comprising:

Dispersing said CNTs in a dispersing medium to prepare a dispersion system;

Mixing said dispersion system with adsorbent so that type-specific CNTs contained in said dispersion system are absorbed onto the adsorbent, wherein the adsorbent is modified by a chemical/biological modifier so as to have different adsorption selectivity to CNTs of different types or properties; and Separating the adsorbent from the dispersion system, whereby the type-specific CNTs adsorbed onto the adsorbent is separated from the CNTs of another type enriched in the dispersion system.

In the method of an embodiment, the adsorbent is bound covalently or non-covalently to the chemical/biological groups on a chemical/biological modifier. The chemical/biological groups on the chemical/biological modifier, in turn, selectively interact with the type-specific CNTs dispersed in the dispersing medium in covalent, non-covalent, or ionic means or other biological selective interaction and the like. The method of an embodiment can be schematically drawn as "fishing" separation process, in which CNTs dispersed in the dispersing medium correspond to "fishes", and the dispersing medium with CNTs dispersed therein corresponds to "pond" and the adsorbent function as a "fish rod". The adsorbent is mixed with a dispersion system of the CNTs dispersed in the dispersing medium by any conventional means, leading to selective adsorption of type-specific CNTs from the dispersion system onto the adsorbent. When the adsorbent is separated from the dispersion system, the adsorbent functions as "fishing rods" and selectively fished out the type-specific CNTs which were dispersed in the pond and now absorbed onto the adsorbent. On the other hand, the CNTs of another type are thus enriched in the resultant dispersion system and can be obtained by simple processes such as filtration.

CNTs

As CNTs used in the method of an embodiment, SWNTs or MWNTs such as double-walled CNTs (DWNTs) and CNTs with more than two walls can be used. Preferably, bundles of SWNTs of M-SWNTs mixed with S-SWNTs can be treated in the method of an embodiment. CNTs to be treated in the present application can be grown by conventional processes such as arc-discharging process, CVD process, and laser evaporation process. However, the preparation method of CNTs to be treated in the present application is not particularly limited. For example, any SWNTs commercially available or produced by any conventional process can be treated in the method of the present application, such as the commercial HiPco-SWNTs available from Carbon Nanotechnologies Inc. (USA), which is produced by decomposing carbon monoxide in high temperature and high pressure with Fe nanoparticles as the catalyst.

In addition, the CNTs to be treated in the present application may be optionally and preferably purified so as to reduce metal catalyst particles and impurities such as amorphous carbon and then be treated by the method of the present application.

Dispersion System of CNTs in a Dispersing Medium

In the "fishing" process of the present application, the adsorbent show adsorption selectivity to the type-specific CNTs. Once the type-specific CNTs absorbed onto the adsorbent is separated, a dispersion system in which CNTs of another type are enriched in the dispersing medium is obtained. Therefore, it is critical to select the dispersing medium used in the present application in order to prepare the dispersion systems of CNTs and successfully carry out the separation process.

The dispersing medium may be solely consisted of any conventional polar solvent which can be used to disperse CNTs. Examples of the polar solvents can be mentioned to water; alcohols including lower alcohol (alcohol containing from one to six carbon atoms) such as methanol, ethanol and the like; ethers, such as diethyl ether, tetrahydrofuran and the like; ketenes, such as NMP, methyl ethyl ketone and the like; amides, such as N,N-dimethyl formamide, N,N-diethyl formamide and the like; and halogenated hydrocarbons, such as ODCB and chloroform; and combination thereof. In addition, ionic liquids such as molten salts, for example, metal chloride (e.g., sodium chloride) may be used as the dispersing medium according to an embodiment. Preferably, when only a polar solvent is used as the dispersing medium, the dispersing medium is selected from the group consisting of NMP, ODCB, N,N-dimethyl formamide, N,N-diethyl formamide, and tetrahydrofuran.

Preferably, the dispersing medium according to the present application is consisted of a surfactant and a polar solvent mentioned above. The presence of a surfactant leads to competition between interaction of selective chemical/biological groups with type-specific CNTs (such as M-SWNTs), and interaction of surfactant molecules with the type-specific CNTs (such as M-SWNTs). The competition, in turn, makes it possible to carry out an effective and efficient "fishing" separation process. When a surfactant is contained in the dispersing medium, it is required to limit the amount of the surfactant with respect to the whole weight of the dispersing medium, as surfactants of an excessive high amount may inhibit the interaction of CNTs with the active groups of the adsorbent. Accordingly, the surfactants are of the amount of not more than 1%, preferably 0.2-1.0 wt %, and more preferably 0.5 wt-0.9 wt %, based on the whole weight of the dispersing medium.

There is no particular limitation to the surfactants used in the method of the present application, as long as they can be used to disperse CNTs. Any typical surfactant can be used in the present application, for example, anionic surfactant, cationic surfactant, non-ionic surfactant, or amphoteric surfactant. Typical examples of anionic surfactant include, for example, sodium alkyl sulfate, sodium alkyl sulfonate, sodium alklyaryl sulfonate, sodium secondary alkyl sulfate and the like. Specific examples of anionic surfactant can be mentioned to SDS. Typical examples of cationic surfactant include, for example, quaternary ammonium salt surfactant, such as cetyl trimethyl ammonium bromide, stearyl dimethyl benzyl ammonium chloride and the like. Typical examples of non-ionic surfactant include, for example, fatty alcohol polyoxyethylene ether, alkyl phenol polyoxyethylene ether, fatty acid polyoxyethylene ether, fatty acid polyalcohol ester, polyoxyethylene alkylamine, and the like. The specific examples of non-ionic surfactant include Triton X100. Typical examples of amphoteric surfactant include betaine amphoteric surfactant, amino amphoteric surfactant and imidazoline surfactant. Usually, a dispersing medium system can be obtained by dissolving one or more of the surfactants mentioned above into conventional solvents such as water, N,N-dimethyl formamide (DMF).

It is preferred to use ionic surfactant in the method of an embodiment, since ionic surfactant is easier to disperse SWNTs. For example, the surfactant used in the present application can be SDS of no more than 1 wt %, preferably 0.2-1.0 wt %, and more preferably 0.5 wt-0.9 wt %, based on the whole weight of the dispersing medium.

In addition, when the polar solvent/surfactant system is used as the dispersing medium, the SWNTs used may be non-specifically interacted with the adsorbent such as inorganic oxide materials including silica and alumina and the like, or with the surfactants employed in the method. Therefore, it is desirable to carry out a proper treatment to eliminate the adverse effect of the non-specific interaction or non-selective physical adsorption on the method of an embodiment. Therefore, as an alternative of the treatment method of an embodiment, ultrasonication can be applied to eliminate the non-specific interaction.

Furthermore, there is no particular limitation to the method for preparing a dispersion system of CNTs in a dispersing medium. Any conventional dispersing technique can be used. For example, stirring, ultrasonication and the like can be used to form a uniform dispersion system of CNTs in the dispersing medium.

Adsorbent

As to the adsorbent used as "fishing rods" in the "fishing" separation process, any material, which can be manufactured into nano-sized particles, can be firmly modified, and can be conveniently removed or recycled by heating or dissolving with chemicals, can be used. For example, adsorbents such as inorganic oxide materials including silica, alumina, and magnesia materials and the like can be used as "fishing rods" of the present application. Preferably, silica materials are used as fishing rod of the method of the present application. More preferably, the silica materials can be silica of different structure, such as silica spheres, silica aggregates, silica wafer, silica film or porous silica or combination thereof.

For the reason of convenient operation, sheet-like silica materials such as silica wafer can be used. The modified silica wafer, when used, can be directly inserted into the dispersion system, and can be conveniently pulled up by hand from the dispersion system. In addition, the use of silica spheres or silica aggregates as "fishing rods" is also convenient for operation, since the simple separation process, i.e., filtration can be employed.

When silica spheres or silica aggregates are used as the "fishing rods", they can be of different structures and different diameters, since different structures and different diameters normally affects the efficiency of the absorption on CNTs. For example, hollow silica spheres and nuclei-shell structure with silica shell usually have a larger surface area, and therefore are desirably used as "fishing rods". An extremely small diameter of silica spheres results in uncontrollable physical adsorption, thereby imposing a negative influence on the selective absorption of CNTs of different conductive properties onto the modified silica. While an extremely large diameter results in smaller surface area, thus reducing the efficient chemically interaction. Accordingly, the average diameter of the silica aggregates may be in the range of 100 nm-50 μm, preferably 1 μm-40 μm, more preferably 10 μm-30 μm, and most preferably 20 μm.

To some extent, the relative irregular or coarse shape may provide an increased surface area, and meanwhile may reduce conglomeration of both CNTs and silica spheres in nanoscale systems. Therefore, in one embodiment of the present application, it is preferred to use silica spheres or aggregates of a relatively irregular or coarse shape and in an average diameter of 100 nm-50 μm, preferably 1 μm-40 μm, more preferably 10 μm-30 μm, and most preferably 20 μm, as the "fishing rods" according to the present application.

Similarly, if the used porous silica materials have a small average pore size, uncontrollable physical adsorption may occur. While if the used porous silica materials have a large average pore size, the adsorption as a whole will reduced. Therefore, the used porous silica materials preferably have an average pore size of 1 nm-10 μm, more preferably 5 nm-1 μm, and even more preferably 10 nm-500 nm.

The above-mentioned preferences for silica materials in terms of for their structure and shape can also applied to other adsorbent such as inorganic oxide materials including alumina materials and magnesia material.

In the present application, the chemical/biological modifier, which can be used to chemically/biologically modify the adsorbent such as inorganic oxide materials including silica materials, can be suitably determined according to type-specific or property-specific CNTs to be separated. Intensive study and research made by the present inventors have found that bromine, amino-containing compounds (such as propylamine, octylamine, octadecylamine, or 3-aminopropyltriethylsilane and the like), large neutral aromatic molecules (such as naphthalene or anthracene and the like), charge transfer aromatic molecules (such as DDQ and TCNQ and the like), and diazo compounds exhibit adsorption to M-SWNTs. In order to have M-SWNTs absorbed onto adsorbent such as inorganic oxide material including silica materials, any materials mentioned above can be used to modify the adsorbent, so that M-SWNTs dispersed in the CNTs/dispersing medium system will be absorbed onto the adsorbent, while S-SWNTs will then be enriched in the resultant dispersion system. On the other hand, porphyrin, poly(9,9-dioctylfluorenyl-2,7-diyl), and single-strand DNA with specific sequence have found to exhibit adsorption to S-SWNTs. Therefore, when the adsorbent is modified with any one of porphyrin, poly(9,9-dioctylfluorenyl-2,7-diyl), and single-strand DNA with specific sequence, S-SWNTs dispersed in the CNTs/dispersing medium system will be absorbed onto the adsorbent, while M-SWNTs will then be enriched in the resultant dispersion system In addition to separation of CNTs based on the metallic and semi-conducting properties, the "fishing" separation process of the present application can also be used to separate desired CNTs based on the properties such as chirality. In order to separate the chiral CNTs, high selective materials such as diporphyrins can be used as the chemical/biological modifier to treat the adsorbent such as inorganic oxide materials including silica materials. As an example of "fishing" process for selective separation of chiral CNTs, meta-phenylene-bridged zinc (II) diporphyrin can be used as the chemical/biological modifier, and alcoholic solvents such as methanol can be used as the dispersing medium.

There is no particular limitation to the process for the modification of the adsorbent such as inorganic oxide materials including silica materials with a chemical/biological modifier. The modification usually can be achieved by mixing the adsorbent with the chemical/biological modifier so that the modifier is adsorbed onto the surface of the adsorbent optionally by means of heating, ultrasonication, and the like.
Schematic Illustration of "Fishing" Separation Process The "fishing" separation process of the present application will be described with reference to FIG. 1 in which the process of the present application is schematically shown.

Figure 1:
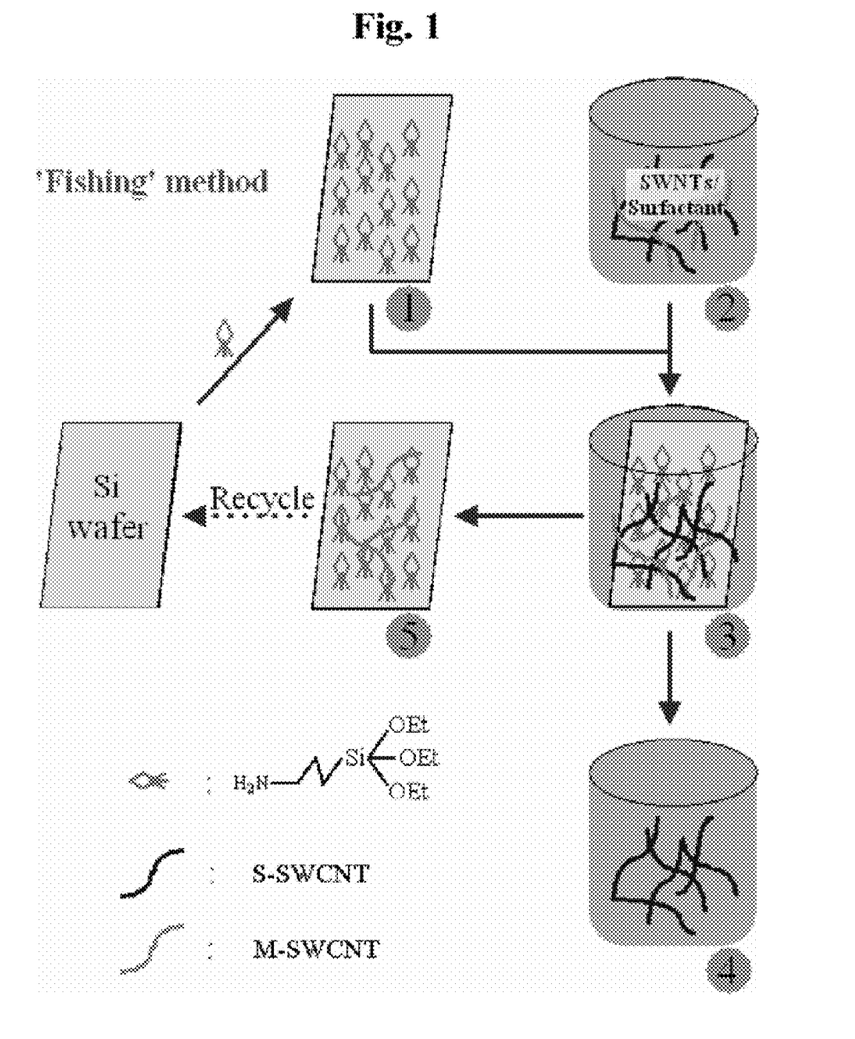
FIG. 1 is the schematic diagram showing the treating method of an embodiment.

As shown in Step 1 of FIG. 1, commercial or solution-synthesized silica are subjected to chemical/biological modification with a chemical/biological modifier. The silica used in the process may be sheet-like or powder-like. CNTs such as commercial Hipco SWNTs are dispersed in a proper dispersing medium with/without surfactants, optionally utilizing conventional techniques such as ultrasonication (as shown in Step 2 of FIG. 1). The modified silica is then mixed with the above SWNTs/dispersing medium system, as shown in step 3 of FIG. 1. When the adsorbent used is in a shape of plate, such as silica wafer, it can be directed inserted into the prepared dispersion system. Thereafter, treatments such as ultrasonication and heating and the like can be applied to the dispersion system mixed with the adsorbent for a proper time period, so that the type-specific CNTs are absorbed onto the surface of the adsorbent. Subsequently, the adsorbent absorbed with the type-specific CNTs can be separated from the dispersing medium as shown Step 5 of FIG. 1. Different processes may be adopted to perform the above-mentioned separation operation, depending on the shape of the adsorbent used. For example, in the case of plate-like materials such as silica wafer, the plate-like materials absorbed with the type-specific CNTs can be pulled up from the dispersing medium by simple operation such as by hand or by machine. When the granular adsorbent such as silica spheres or aggregates are used, they can be separated from the dispersing medium by conventional filtering processes utilizing a filtering film of a proper pore size. On the other hand, the separation of the adsorbent adsorbed with the type-specific CNTs results in an enrichment of the CNTs of another type in the dispersing medium as shown in Step 4 of FIG. 1.

High proportional CNTs of different types can be obtained by the "fishing" separation process of the present application. For example, very high proportional, even up to 100%, type-specific CNTs (such as M-SWNTs or S-SWNTs) can be obtained by separating the absorbed type-specific CNTs from the adsorbent through the conventional techniques such as ultrasonication. The CNTs of another type enriched in the dispersing medium can be of 60-100%, preferably 60-80% proportion.

In one preferred embodiment, the "fishing" separation process of the present application can be recycled. As a result, the proportion of the CNTs of another type dispersed in the dispersing medium can be further improved. The "fishing" separation of an embodiment can be recycled until a high proportional or approximately 100% of SWNTs of different types or properties is achieved.

In another embodiment of the present application, the method of the present application further comprises a post-treatment step of treating the adsorbent absorbed with the type-specific CNTs so as to separate the type-specific carbon nanotubes and the adsorbent, and regenerate the adsorbent for further use. The regenerating treatment can be performed by treating said adsorbent by means of ultrasonication or annealing, or other processes. The regenerating treatment, on one hand, can be used to collect the type-specific CNTs absorbed onto the adsorbent, and the obtained type-specific CNTs can be in a high proportion, even 100%. On the other hand, the adsorbent obtained by the regenerating treatment can be re-used in the "fishing" process, whereby the cost is reduced.

The regenerating treatment such as ultrasonication or annealing can be used to separate the absorbed CNTs from the adsorbent, since the absorption between the adsorbent and the CNTs is weakened. Other processes include chemical process in which chemical agents such as acids or bases are used to separate the absorbed CNTs from the adsorbent. For example, in the case of silica materials as the adsorbent, an aqueous solution of hydrofluoric acid (HF) in a proper concentration (such as 5%-49% HF) can be used to dissolve/disperse the silica materials. Alternatively, when alumina materials are used, an aqueous solution of acid and base, for example, NaOH solution can be used to dissolve/disperse alumina materials. When the adsorbent absorbed with the type-specific CNTs are treated with chemical agents such as acids or bases, a deposit of the type-specific CNTs is obtained, and then washed with water or alcohol to obtain high proportional type-specific CNTs.
Characterization Method To confirm the presence of the chemical groups which selectively interact with the type-specific CNTs, the adsorbent such as silica materials is analyzed by X-ray photoelectron (XPS) spectroscopy.

The separated CNTs (such as S-SWNTs or M-SWNTs) are characterized by Raman spectra and Vis-NIR spectra.

Raman spectroscopy is a powerful measure for characterization of SWNTs, from which diameter and electrical properties of the SWNTs can be determined. When the Raman spectroscopy is performed, all the samples used in the Raman testing may be treated as follow: ultrasonic treatment in ethanol for 5 minutes or more, and then the resulting suspensions are dropped onto the glass sheet and dried in air, in order to exclude the influence of the aggregation of the SWNTs on the testing results.

In Raman spectrum, Radial-Breathing Mode (RBM) corresponding to one of the feature diffraction mode of the SWNTs appears in the low frequency of 130-350 cm$^{-1}$. The frequency of the RBM mode is inversely-proportional to the diameters of the SWNTs, and the relation can be expressed as $\omega=223.75/d+6.5$ (for example, refer to Lyu, S. C.; Liu, B. C.; Lee, T. J.; Liu, Z. Y.; Yang, C. W.; Park, C. Y.; Lee, C. J., *Chem. Commun.* 2003, 734), wherein, $\omega$ is RBM frequency with cm$^{-1}$ as unit, d is the diameter of the SWNTs with nm as unit, and the aggregation effect is also considered therein. The RBM frequency of 130-350 cm$^{-1}$ corresponds to the diameter of 0.6-1.8 nm. However, the shoulder peak of 1552 cm$^{-1}$ appearing at the left of the main peak of 1586 cm$^{-1}$ (G Band) is attributed to the split of the $E_{2g}$ mode of the graphite. Moreover, the shoulder peak is also one of the feature diffraction mode of the SWNTs (for example, refer to A. Kasuya, Y. Sasaki, Y. Saito, K. Tohji, Y. Nishina, *Phys. Rev. Lett.* 1997, 78, 4434). In addition to these feature peaks, the peak appearing at 1320 cm$^{-1}$ corresponds to the mode induced by the defect, i.e., D band, and this corresponds to the defects of amorphous carbon and the like included in the sample. Moreover, the G/D ratio is the indicator for evaluating the purity of the SWNTs, and the ratio is increased with the increase of the purity of the SWNTs (for example, refer to H. Kataura, Y.

Kumazawa, Y. Maniwa, Y. Ohtsuka, R. Sen, S. Suzuki, Y. Achiba, *Carbon* 2000, 38, 1691).

Near-IR spectrum can be used to determine the ratio of the semiconducting SWNTs to the M-SWNTs.

EXAMPLES

The following examples are intended to illustrate the present application in further details according to an embodiment. However, the scope of the present application is not limited by these examples, but defined by the attaching claims. Unless specifically indicated in the specification, the proportion of S-SWNTs or M-SWNTs in the pristine or treated CNTs refers to the ratio of S-SWNTs or M-SWNTs in relation to the total amount of S-SWNTs and M-SWNTs by weight. Unless specifically indicated in the specification, raw materials and reagents used in the present application are all commercially available or can be obtained by any conventional techniques in the art.

Example 1

In the present example, inorganic oxide materials, i.e., silica aggregates, used as "fishing rods", 3-aminopropyltriethylsilane available from Acros is used as the chemical/biological modifier, and ionic surfactant, sodium dodecyl sulfate (SDS)/water is used as the dispersing medium.

The dispersion of the CNTs in a dispersing medium was prepared first. As shown in Step 2 of FIG. 2, commercial Hipco SWNTs (0.5 mg) available from Carbon Nanotechnologies Inc., U.S.A. were well dispersed in deionized water (25 ml) with the help of 1% SDS so as to obtain the SWNTs/dispersing medium system.

Figure 2:
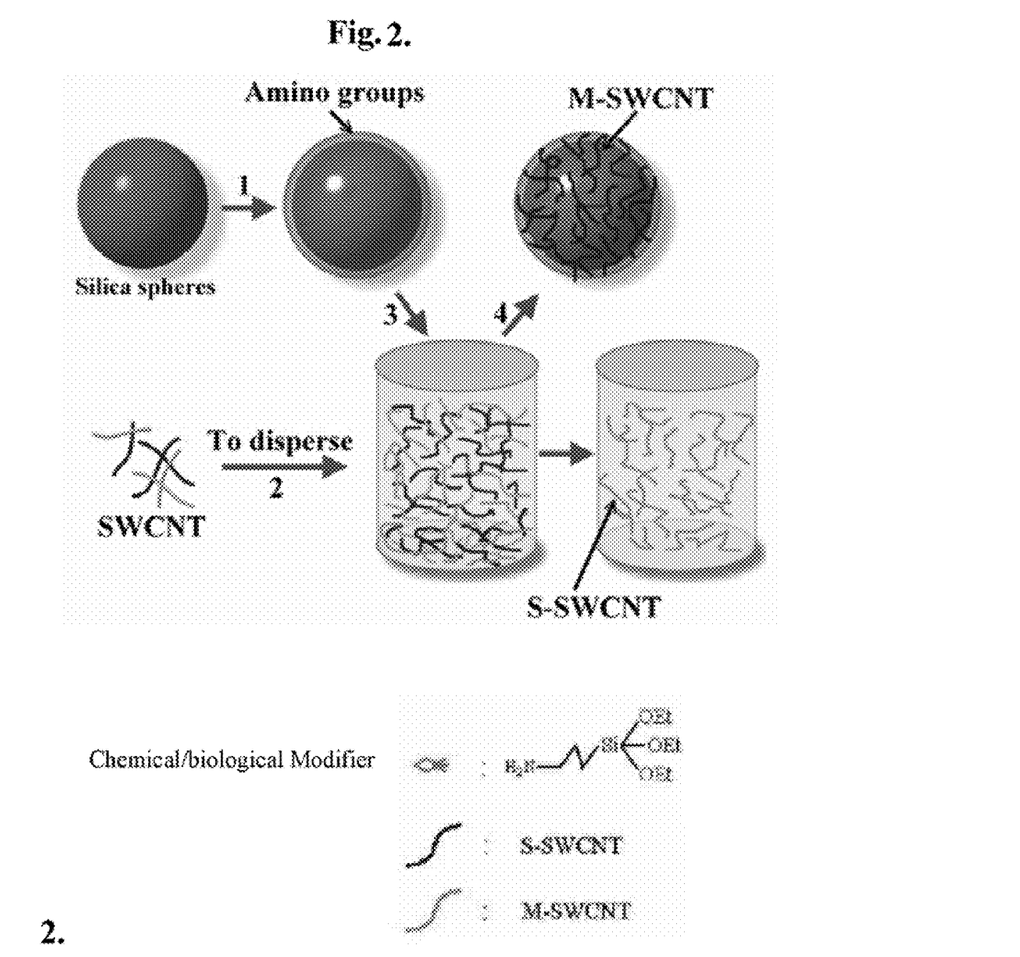
FIG. 2 is the schematic diagram showing the steps of Example 1 of an embodiment.
Figure 3:
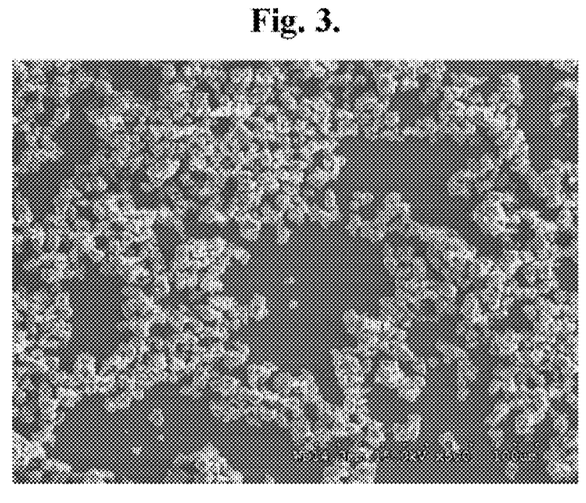
FIG. 3 shows the SEM photographs of the silica aggregates used in Example 1 of an embodiment.
Figure 4:
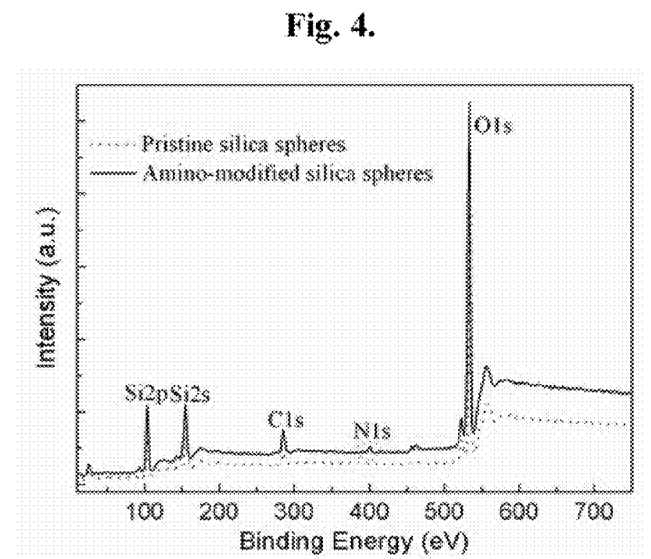
FIG. 4 shows the X-ray photoelectron spectra of pristine and amino-modified silica aggregates used in Example 1 of an embodiment.

Next, the modification of the adsorbent with chemical/biological modifier was performed. As shown in FIG. 2, as the "fishing rods", the adsorbent utilized silica aggregates in an average diameter of 20 μm commercially available from Sino Silica Co., Ltd, China, and the silica aggregates were used as received. The typical SEM image of the silica aggregates is shown in FIG. 3. As shown in Step 1 of FIG. 2, the silica aggregates (100 mg) were modified with the amino compound. Specifically, the silica aggregates were introduced into a 10 mM solution in ethanol of 3-aminopropyltriethylsilane (Acros). The reaction mixture was hold at 80° C. for 3 h with continuous stirring. The resulting mixture was then centrifuged and rinsed thoroughly with ethanol. The presence of amino groups on silica aggregates was confirmed by X-ray photoelectron spectroscopy. The result is shown in FIG. 4. in which the X-ray photoelectron spectra of the pristine and silica aggregates modified with amino group are compared. It can be found in FIG. 4 that a peak at 399.7 eV for amino-modified silica aggregates should be attributed to nitrogen in the amino groups.

Thereafter, the amino-modified silica aggregates (50 mg) were mixed with the SWNTs/dispersing medium system, as shown in Step 3 of FIG. 2. The mixture was subjected to ultrasonication treatment with a proper power for about two hours. As a consequence, M-SWNTs were selectively adsorbed onto the amino-modified silica aggregates due to the specific interaction with the amino groups.

Figure 5:
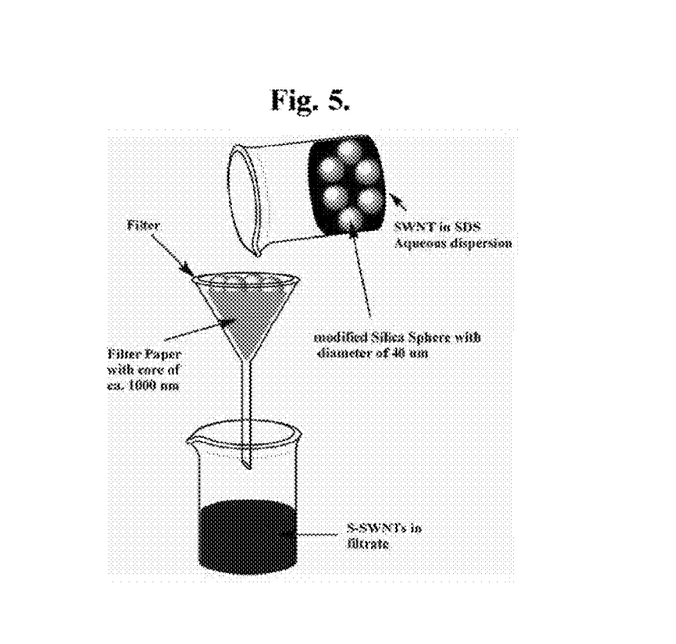
FIG. 5 is the schematic diagram showing a filter process in Example 1 of an embodiment.

Step 4 of FIG. 2 shows that a conventional filtration means can be used to separate the amino-modified silica aggregates absorbed with M-SWNTs from the resultant dispersion system. For example, filter paper with the pore diameter of 1 μm can be used in the filtration. As shown in the filtering process of FIG. 5, silica aggregates absorbed with M-SWNTs were kept onto the filter paper due to their diameter larger than the filter paper's pore diameter. On the other hand, the M-SWNTs which are not absorbed onto the silica aggregates and the S-SWNTs remaining in the dispersing medium passed through the filter paper as a filtrate. As a result, S-SWNTs were enriched in the filtrate, which was kept as a uniform dispersion system.

Figure 6:
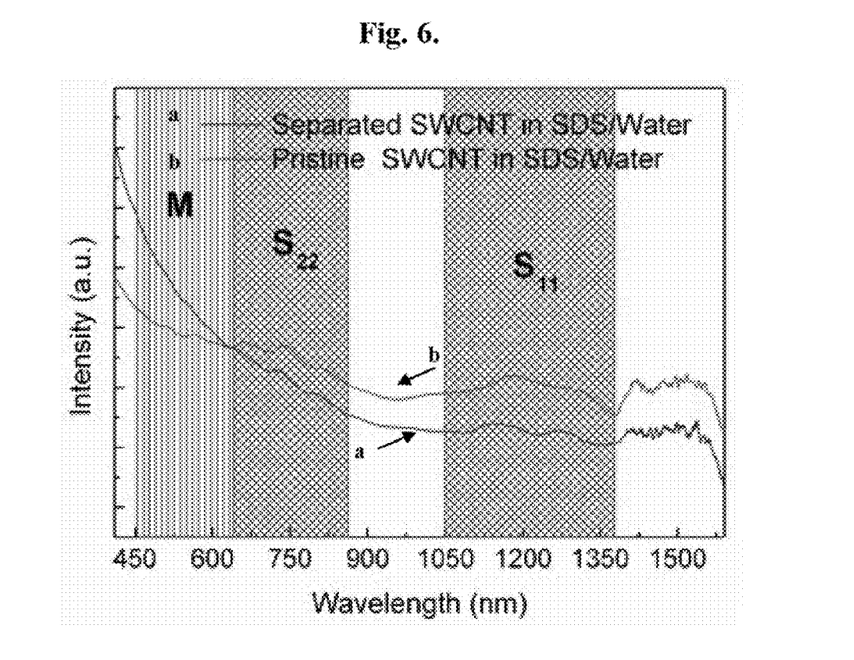
FIG. 6 shows the Vis-NIR spectra of pristine and separated SWNTs in Example 1 of an embodiment.

The separated sample in water/SDS can be examined by Vis-NIR. The Vis-NIR spectrum of the enriched dispersion system of S-SWNT in the SDS/water is shown in FIG. 6, in which Curve "a" corresponds to SWNTs enriched in water/SDS, and Curve "b" corresponds to the pristine SWNTs. Three regions can be identified in the absorption spectra in FIG. 6: the first transition M (450-650 cm$^{-1}$) due to M-SWNTs; and the first and second transitions S11 (1050-1350 nm) and S22 (650-900 nm) due to S-SWNTs. As compared with the pristine SWNTs, the separated SWNTs has decreasing or dispersing peaks in the metallic M region and have obvious peaks in the semiconducting regions S11 and S22, indicating an enrichment of S-SWNTs (about 67% by weight) present in the filtrate.

Figure 7:
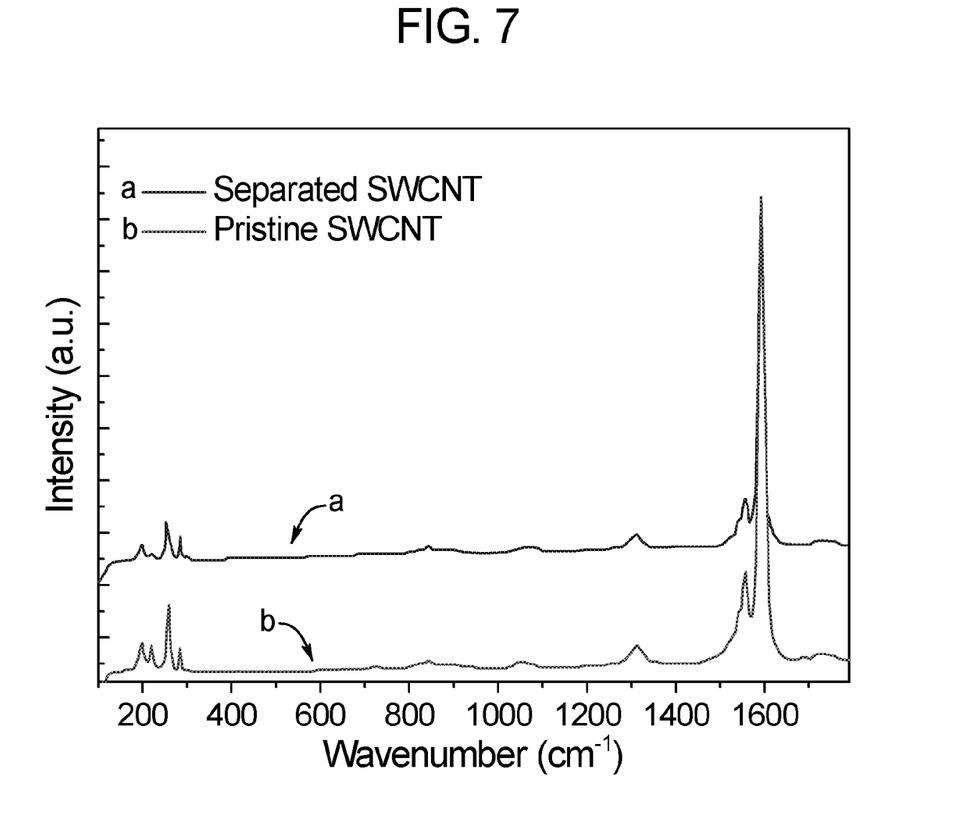
FIG. 7 shows Raman spectra (633 nm) of pristine and separated SWNTs in Example 1 of an embodiment.
Figure 8:
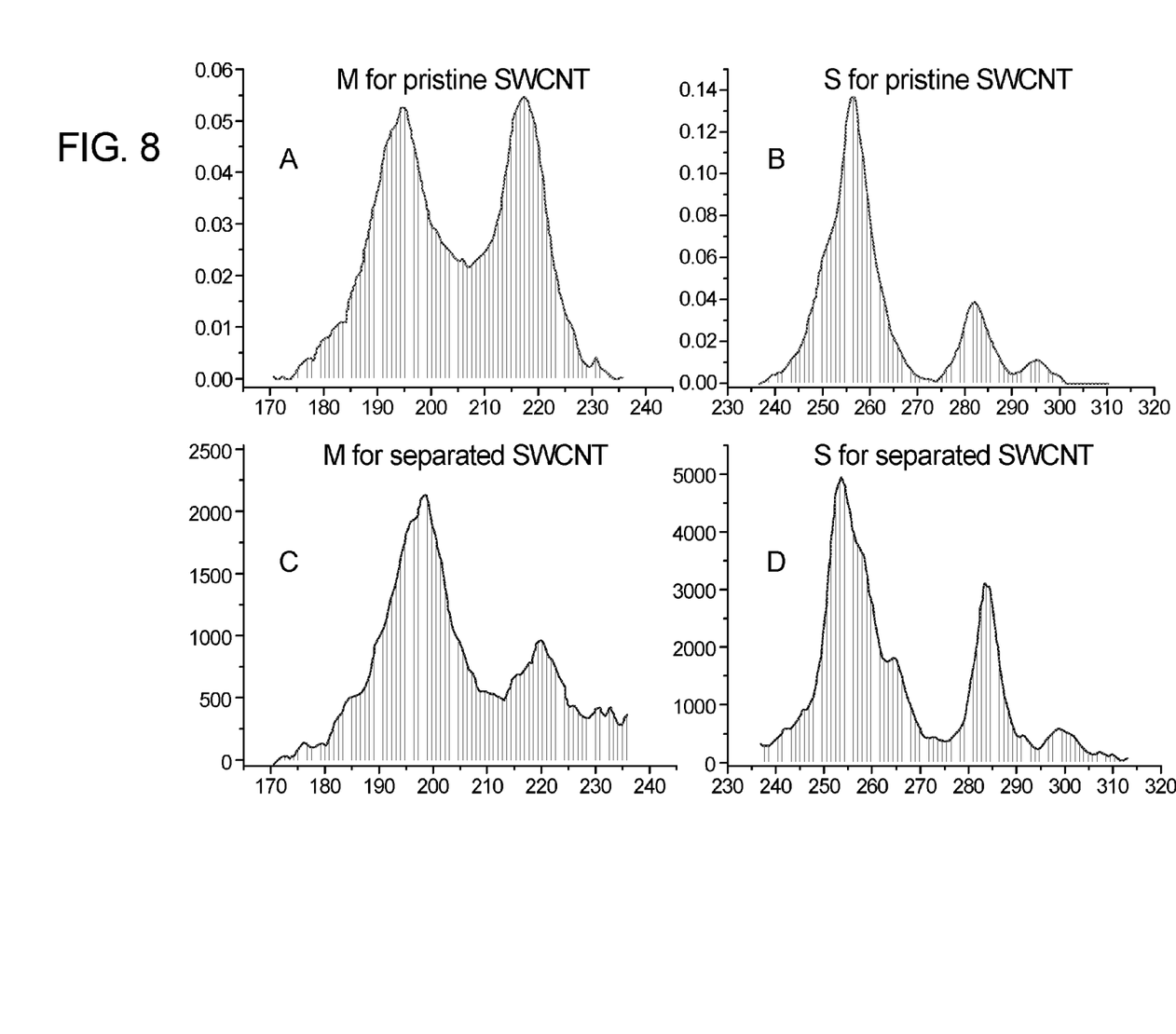
FIGS. 8A-8D show the partially-enlarged view of radial breathing mode (RBM) region of FIG. 7, each showing integrated area in RBM region of semiconducting (S) and metallic (M) of pristine and the first separated SWNTs used in Example 1 of an embodiment.

The separated sample in water/SDS was also examined by Raman spectra (633 nm excitation) as shown in FIG. 7. The Raman results are consistent with that of Vis-NIR spectra. In the Raman spectra of FIG. 7, the increase or decrease of the relative intensity is reflected in RBM region (175 nm-315 nm), which are enlarged in FIGS. 8A-8D. It can be seen from the Raman spectra that the M-SWNTs are separated from the SWNTs dispersion system. Furthermore, the separation efficiency was evaluated by integrating peak areas based on the Origin (6.0) integrating software. The proportion of M-SWNTs and S-SWNTs in the pristine SWNTs (FIGS. 8A and 8B) and the proportions of M-SWNTs and S-SWNTs in the separated SWNTs in the filtrate (FIGS. 8C and 8D) were calculated by integrating the peak areas shown in FIGS. 8A-8D. The proportion of S-SWNTs in the separated SWNTs in the filtrate is 67% by weight, and the proportion of S-SWNTs in the pristine SWNTs is 56.4% by weight. That is to say, an increase of the proportion of S-SWNTs by about 11% by weight was obtained by the "fishing" separation process of the present application.

Example 2

In order to further increase the proportion of S-SWNTs in the filtrate, the above-described "fishing" separation process can be performed for more than one cycle. In the present example, the separation process described in Example 1 was repeated. The separation results were shown in FIGS. 9A-9D in which the typical Raman spectra in RBM region of pristine SWNTs and the SWNTs in the filtrate after the "fishing" separation process was recycled once, and FIG. 9E shows the integrated value of the peaks in the above figures.

Figure 9:
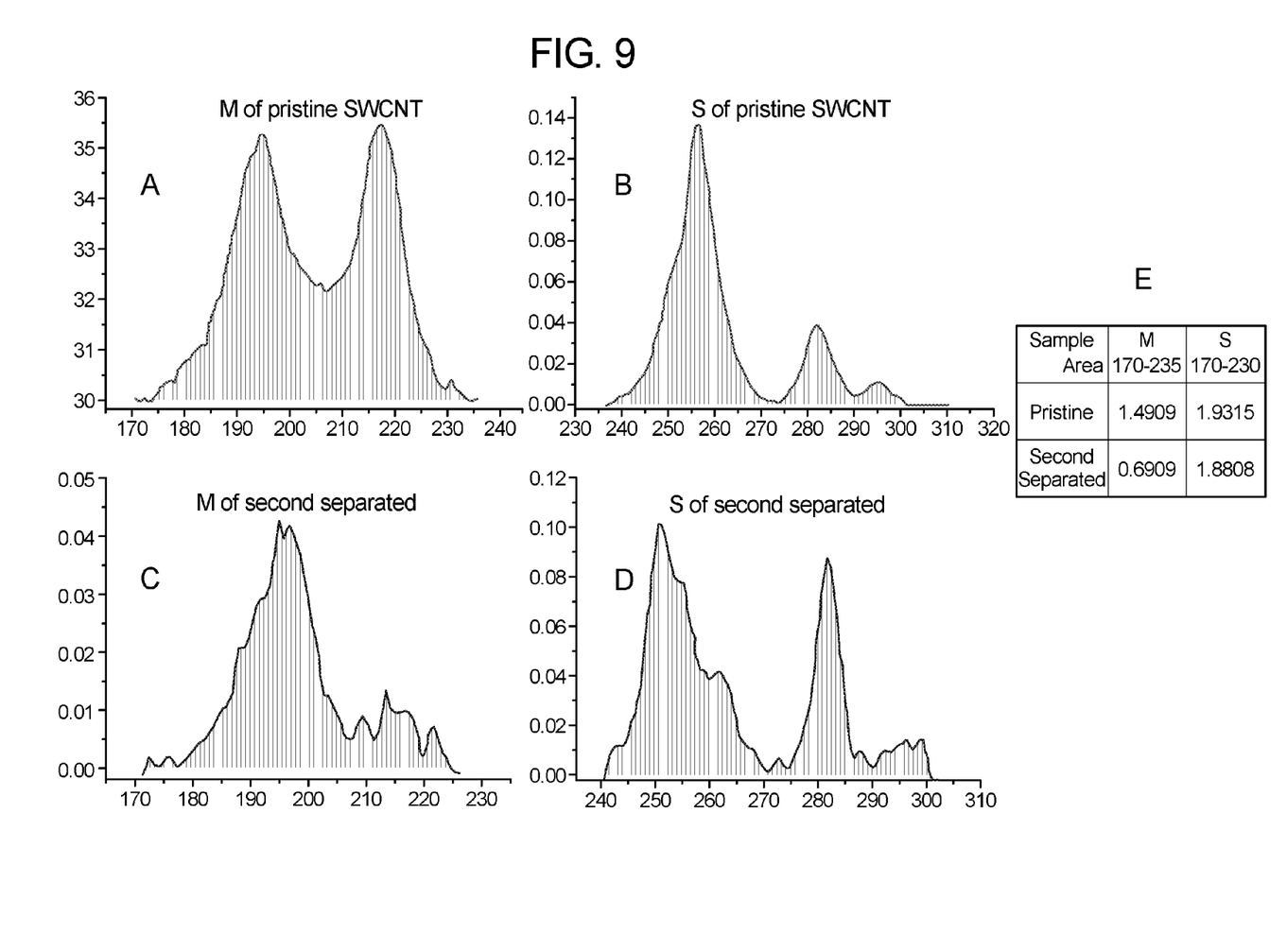
FIGS. 9A-9D show integrated areas in RBM region of semiconducting (S) and metallic (M) of pristine and the second separated SWNTs used in Example 2 of an embodiment.
FIG. 9E shows the calculated value of integrated area in RBM region of semiconducting (S) and metallic (M) of pristine and the second separated SWNTs in Example 2 of an embodiment.

It can be obtained from FIG. 9E that the filtrate after the recycle of the process once contained 73.1% proportional S-SWNTs. As compared with the pristine proportion of 54% for S-SWNTs, an increase of about 16% for S-SWNTs was obtained by performing the "fishing" separation process twice. As compared with the result (67%) obtained by performing the process once, an increase of about 5% was also obtained. As a result, the "fishing" separation process of the present application exhibits remarkable separation efficiency for S-SWNTs. It is expected that high-proportional, even 100% S-SWNTs can be obtained by recycling the process of the present application more than once.

Example 3

Figure 10:
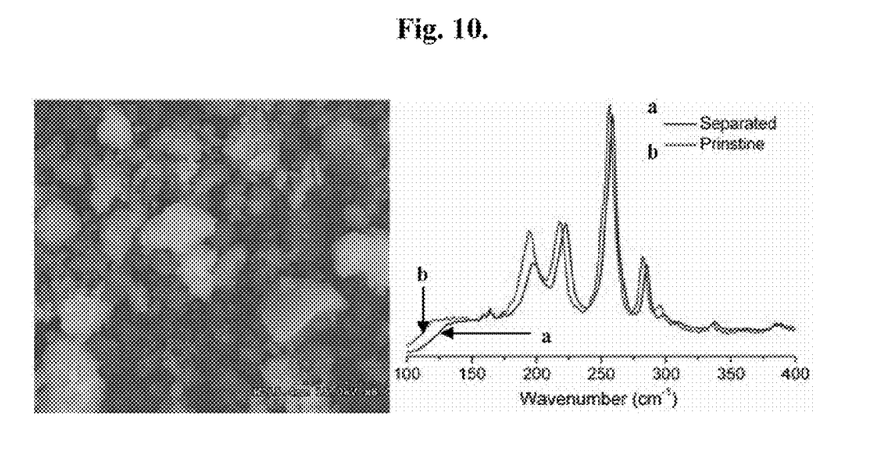
FIG. 10 shows the SEM image of silica aggregation with smaller diameter and Raman spectra of the filtrate after "fishing" process of Example 3 of an embodiment.

In this example, the "fishing" separation process was performed and the sample was examined in a similar way to Example 1, except that silica aggregates of a smaller diameter (commercial available from Aldrich) were used as the "fishing rods". The test results were shown in FIG. 10 in which the typical SEM image of the silica aggregates and the corresponding separation results.

A comparison between the results of Examples 1 and 3 shows that a better separation result is obtained by using the silica aggregates of an average diameter of 20 μm.

Example 4

In this example, the "fishing" separation process was performed and the sample was examined in a similar way to Example 1, except that silica spheres of regular and smooth surface synthesized by the method reported in J. Colloid Interface Sci. 1968, 26, 62 were used as the "fishing rods". The test results were shown in FIG. 11 in which the typical SEM image of the silica spheres of regular and smooth surface and the corresponding separation results.

Figure 11:
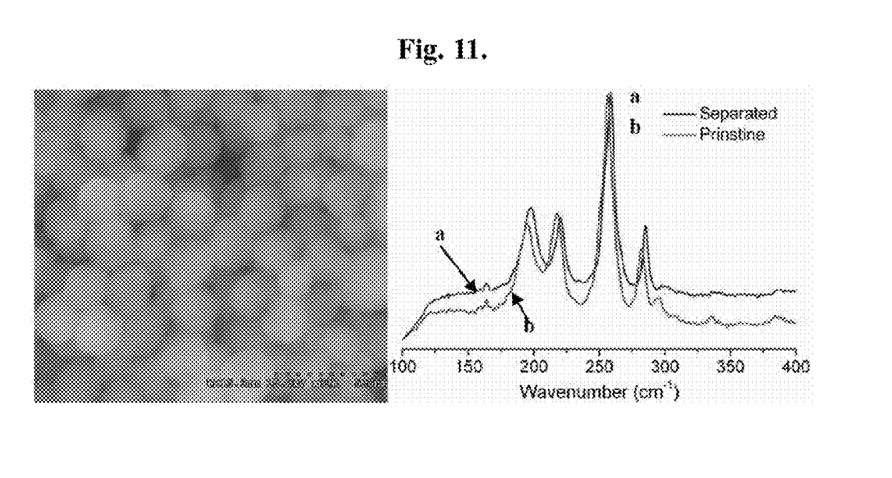
FIG. 11 shows the SEM image of silica spheres of regular and smooth surface and Raman spectra of the filtrate after "fishing" process of Example 4 of an embodiment.

It is clearly indicated in FIG. 11 that silica spheres of regular and smooth surface show low-efficiency for separating SWNTs. Therefore, it is advisable to silica spheres/aggregates of an irregular or coarse shape for performing the separation process.

Example 5

In this example, the "fishing" separation process was performed and the sample was examined in a similar way to Example 1, except that Triton X100/DMF was used as the dispersing medium.

Figure 12:
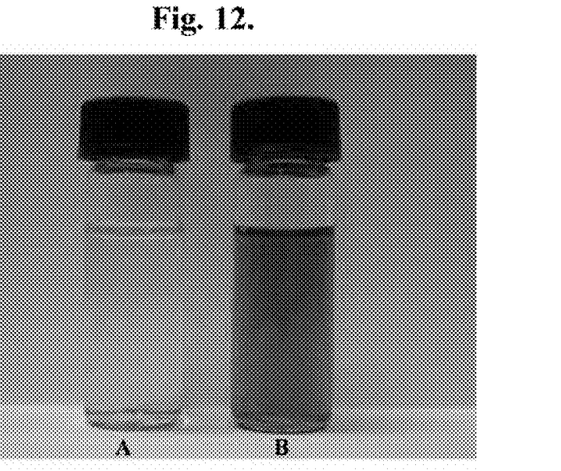
FIGS. 12A and 12B show the appearances of the filtrates produced in Example 1 and 5.

The "fishing" process of the present example produced a filtrate is clear as shown in FIG. 12A, but a better dispersed system was obtained for SDS/Water used in Example 1. The comparison shows that SDS/Water is more proper and favorable for the separation of the fishing technique of the present application.

Figure 13:
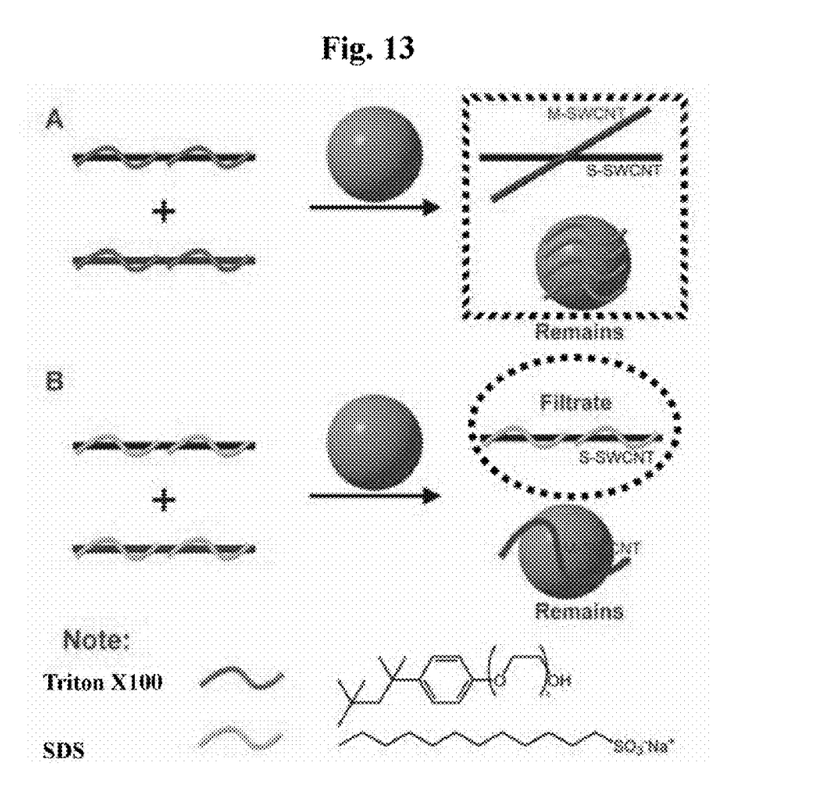
FIG. 13 is the schematic diagram for explaining the possible competitive mechanisms of Triton X100(A) and SDS (B) with active groups on silica, respectively, during "fishing" process of Example 5 of an embodiment.

Based on the above results, the inventors of the present application have proposed the following possible mechanism as depicted in FIG. 13.

As shown in FIGS. 12A and 12B, briefly, although both Triton X100 and SDS can effectively disperse SWNTs, Triton X100 may interact with modified silica spheres and prevent them from efficient dispersion of SWNTs during filtration process (FIG. 12A), thus resulting in the remaining of modified silica spheres and S/M SWNTs on filter paper. As compared with Triton X100, SDS may effectively convoy SWNTs, mostly S-SWNTs, through the holes of filter paper.

Figure 14:
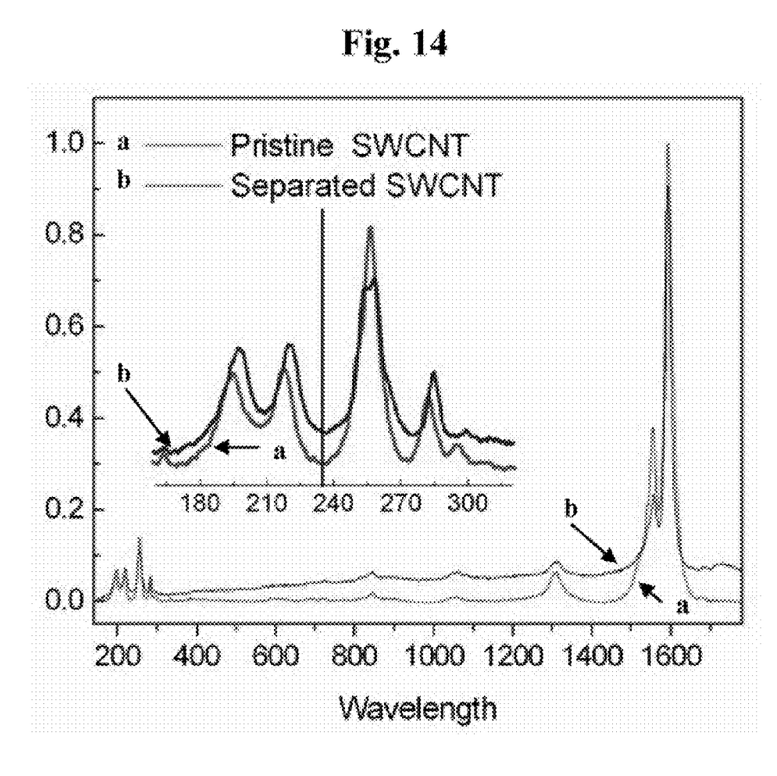
FIG. 14 shows Raman spectra after "fishing" process under excess SDS (more than 1 wt %).

In addition, it is important to optimize the amount of SDS in the dispersing medium. Usually, the amount of the surfactant based on the whole weight of the dispersing medium is not more than 1%, preferably 0.2-1.0 wt %, and more preferably 0.5 wt-0.9 wt %. As an example, under excess SDS (e.g. 2.5% w/w), there are little difference between pristine and separated SWNTs (FIG. 14). That is, no separation processes occurs.

The treatment method according to the embodiment of the present application can have the following advantages: first, the treatment method of the present application does not need the complicated post-treatment such as centrifugal separation to separate type-specific CNTs from CNTs of another type; second, the method according to the present application can have high yield, and CNTs of two different types or properties can be obtained; and third, the treatment method of the present application may enrich certain type of CNTs in a high proportion, even up to 100%. In addition, the structure of certain type of CNTs obtained by the treatment of the present application is not subjected to damage during the treatment, and the structure and properties can kept intact.

Although the description is made with the SWNTs as the treatment objects in the above examples, it should be understood by those skilled in the art that the treatment method of the present application will make the same effect to the MWNTs, especially to the multi-walled carbon nanotubes with small diameter and relatively small number of sidewalls (two layers or three layers, for example), enabling the separation of the metallic multi-walled carbon nanotubes and semiconducting counterparts.

With the treatment method according to an embodiment, the separation for CNTs of different conductivity is performed and both the S-SWNTs and M-SWNTs can be enriched, and hence the enriched S-SWNTs and M-SWNTs can be further used for various electronic devices, for example, conductive film and field emission source and also can be used in other types of CNT device, such as, a filed effect transistor, a conductive wire, a nano electro-mechanic system (NMES), a nano cantilever, a quantum computing device, a lighting emitting diode, a solar cell, a surface-conduction electron-emitter display, a filter (e.g., high-frequency or photonic band), a drag delivery system, a thermal conductive material, a nano nozzle, an energy storage system, a fuel cell, a sensor (e.g., a gas, glucose, or ion sensor), or a catalyst support material, which use the treated CNTs according to the present application. Another embodiment of the present application relates to using the above treated CNTs to fabricate carbon nanotube devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for treating carbon nanotubes, comprising:
    dispersing said carbon nanotubes in a dispersing medium to prepare a dispersion system;
    mixing said dispersion system with an adsorbent so that type-specific carbon nanotubes contained in said dispersion system are absorbed onto the adsorbent, wherein the adsorbent is modified by a chemical/biological modifier so as to have different adsorption selectivity to carbon nanotubes of different types; and
    separating the adsorbent from the dispersion system, whereby the type-specific carbon nanotubes adsorbed onto the adsorbent is separated from the carbon nanotubes of another type enriched in the dispersion system.

2. The method of claim 1, wherein said carbon nanotubes are selected from the group consisting of single-walled carbon nanotubes or multi-walled carbon nanotubes or combination thereof.

3. The method of claim 1, wherein the carbon nanotubes of different types include metallic carbon nanotubes or semiconducting carbon nanotubes.

4. The method of claim 1, wherein the adsorbent is an inorganic oxide material selected from the group consisting of silica materials, alumina materials, magnesia materials, and combination thereof.

5. The method of claim 4, wherein said silica comprises silica spheres, silica aggregates, silica wafers, silica films, porous silica or combination thereof.

6. The method of claim 4, wherein said silica is silica spheres or aggregates having an average diameter of 100 nm-50 μm.

7. The method of claim 1, wherein the chemical/biological modifier is selected from the group consisting of bromine, amino-containing compounds, large neutral aromatic molecules, charge transfer aromatic molecules, diazo compounds and combination thereof, each of which exhibits adsorption to metallic single-walled carbon nanotubes; or is selected from the group consisting of porphyrin, poly(9,9-dioctylfluorenyl-2,7-diyl), single-strand DNA with specific sequence, each of which exhibits adsorption to semi-conducting single-walled carbon nanotubes.

8. The method of claim 1, wherein said dispersing medium includes a polar solvent selected from the group consisting of water, alcohols, ethers, ketenes, amides, halogenated hydrocarbons and combination thereof.

9. The method of claim 8, wherein said dispersing medium includes a surfactant and the polar solvent, wherein said surfactant is selected from the group consisting of ionic surfactant, non-ionic surfactant, cationic surfactant, zwitterionic surfactant and combination thereof.

10. The method of claim 9, wherein the surfactant is ionic surfactant which is sodium dodecyl sulfate.

11. The method of claim 9, wherein an amount of the surfactant is not more than 1% based on a total weight of the dispersing medium.

12. The method of claim 1, wherein an ultrasonication is performed after said adsorbent is mixed with the dispersion system.

13. The method of claim 1, further comprising a post-treatment step of treating the adsorbent absorbed with the type-specific carbon nanotubes so as to separate the type-specific carbon nanotubes and the adsorbent, and regenerate the adsorbent for further use.

14. The method of claim 13, wherein said treatment includes treating said adsorbent by means of ultrasonication or annealing, or with chemical agents selected from hydrofluoric acid and sodium hydroxide.

* * * * *